United States Patent [19]
Jett et al.

[11] 3,960,015
[45] June 1, 1976

[54] WELL FLOW SENSING APPARATUS

[75] Inventors: Marion Barney Jett, Dallas; Jay Warner Jackson, Arlington; Richard Eugene Irby, Irving, all of Tex.

[73] Assignee: Dresser Industries, Inc., Dallas, Tex.

[22] Filed: June 4, 1975

[21] Appl. No.: 583,733

Related U.S. Application Data

[63] Continuation-in-part of Ser. No. 558,871, March 17, 1975.

[52] U.S. Cl. .............................. 73/155; 200/81.9 R
[51] Int. Cl.² ......................................... E21B 47/10
[58] Field of Search ...................... 73/155, 210, 392; 200/81.9 R, 81.9 M, 81.9 HG, DIG. 31; 340/239 R; 175/48

[56] References Cited
UNITED STATES PATENTS

| | | | |
|---|---|---|---|
| 643,876 | 2/1900 | Lane | 73/392 X |
| 2,853,575 | 9/1958 | Reynolds | 200/81.9 R |
| 3,297,843 | 1/1967 | Hoss | 200/81.9 M |
| 3,526,041 | 9/1970 | Alder | 73/155 X |

*Primary Examiner*—Jerry W. Myracle
*Attorney, Agent, or Firm*—Michael J. Caddell

[57] ABSTRACT

Apparatus for sensing the flow from a pumped well and for generating signals indicative of that flow includes an orifice flow sensing system adapted to be placed into the flowline of a pumped well and being operably connected to an electro-mechanical signal switch.

18 Claims, 8 Drawing Figures

WELL FLOW SENSING APPARATUS

This application is a continuation-in-part of an original application, Ser. No. 558,871, filed Mar. 17, 1975, for "WELL FLOW SENSING APPARATUS".

BACKGROUND OF THE INVENTION

This invention relates to control apparatus for pumping oil wells and more particularly involves flow detection means to be used in the flowlines of pumped oil wells to indicate when fluid is being produced from the pumped well.

In an oil well pumpoff control system such as that disclosed in U.S. Pat. No. 3,854,846 and U.S. Pat. Applications Ser. No. 452,851 now U.S. Pat. No. 3,946,462; Ser. No. 469,264 now U.S. Pat. No. 3,938,910; Ser. No. 519,904; and Ser. No. 520,993 now U.S. Pat. No. 3,936,231, all assigned to the assignee of this invention, means are required for determining when the oil well pump is performing efficiently. This involves many methods, such as measuring the level of fluid in the well bore, measuring the load on the walking beam by strain gauge, measuring the amperage on the prime mover power supply, measuring the amperage drawn by electric submersible pump, and by sensing the production of fluid through the well flowline.

Many of these sensing devices suffer from the disadvantages of over-complexity, inability to detect pump failure, and inclination to become stopped up or fouled by sediment, paraffin and/or sand carried by the produced well fluid.

The present invention overcomes these difficulties by providing a packaged sensing unit that can be quickly and simply inserted in the well flowline and which exhibits extended reliability and resistance to fouling.

The entire application, Ser. No. 469,264, entitled "OIL WELL PUMPOFF CONTROL SYSTEM UTILIZING INTEGRATION TIMER" by Bobby L. Douglas, filed May 13, 1974 now U.S. Pat. No. 3,938,910, is herein incorporated by reference.

DESCRIPTION OF THE PREFERRED EMBODIMENTS

Figure 1:
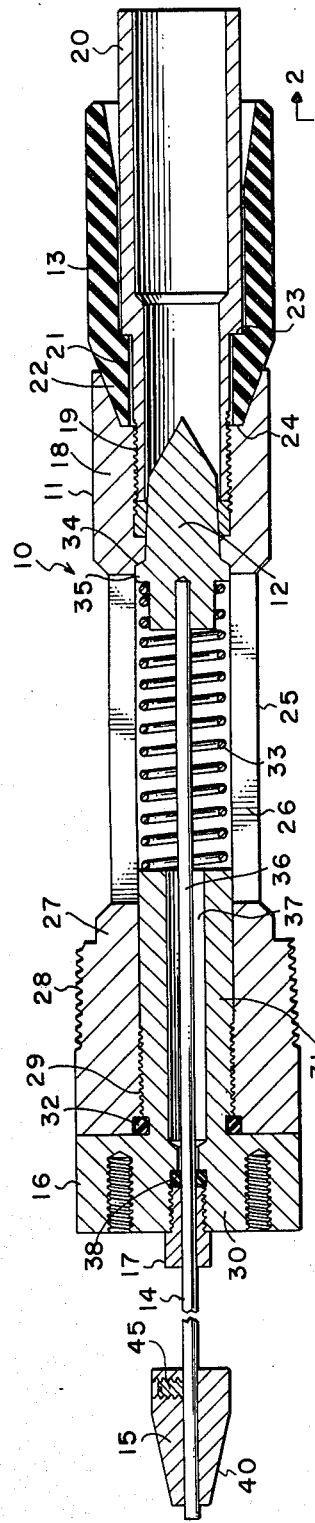
FIG. 1 is a cross-sectional view of one embodiment of the sensor of this invention.

Referring first to FIG. 1, the flow sensing cartridge 10 is disclosed which utilizes a tubular body 11, an orifice closing member 12, an elastomeric sealing cup 13, a signal rod 14, a signal cam 15, and a seal receptacle 16 having threaded therein a packing seal 17. Tubular member 11 has a forward thickened portion 18 having internal threads 19 therein. A tubular seal retaining sleeve 20 having an end portion 21 with a reduced diameter and external threads thereon is engaged by means of said threads in the threaded portion 19 of tubular body 11.

The reduced outer diameter 21 of retainer 20 forms an annular shoulder 23 facing tubular body 11. A corresponding annular shoulder 24 is formed in body member 11 facing annular shoulder 23. Sealing cup 13 is molded for a relatively close fit on retaining sleeve 20. Cup 13 therefor has reduced inner diameter section 22 fitting upon reduced end portion 21 of retainer sleeve 20. Shoulders 23 and 24 serve to compress reduced ID section 22 and retain sealing cup 13 on sealing retainer sleeve 20.

Tubular body 11 has in its central portion a reduced OD flow section 25 having longitudinal slots 26 passing therethrough. A thickened end portion 27 is formed on body 11 at the end opposite section 18. Thickened portion 27 has external threads 28 thereon and internal threads 29 formed in the outer end. A seal receptacle 16 having a wide flat end 30 and a narrower cylindrical rod guide 31 formed thereon is threadedly engaged in portion 27 of body 11 by means of threads 29.

A circular seal 32 is provided therebetween to prevent fluid leakage between receptacle 16 and body 11. The narrow extended cylindrical portion 31 of receptacle 16 extends into the central portion 25 of body 11 and provides a seating surface for compression spring 33 which is contained within central section 25 in abutting engagement against orifice member 12. Spring 33 is arranged to provide a constant biasing force on orifice member 12 moving it towards an annular orifice seat 34 formed in the forward portion 18 of body 11. An annular external shoulder 35 is formed on orifice member 12 to provide at its left edge an abutment surface to receive coil spring 33, and on its right edge a slanted sealing surface to sealing engage seat 34.

An elongated signal rod 36 is securely engaged in the left side of downstream side of member 12 and extends through an opening 37 in cylindrical end 31, passing through the wide end 30 and extending a substantial distance past receptacle 16. A circular seal 38 is located around rod 36 in snug fitting engagement. A seal retaining screw 17 having a rod passage relatively centrally located therein is threadedly engaged in receptacle 16 in abutment with seal 38 to retain seal 38 and prevent flow of gas or liquid out of receptacle 16 around rod 36.

Figure 2:
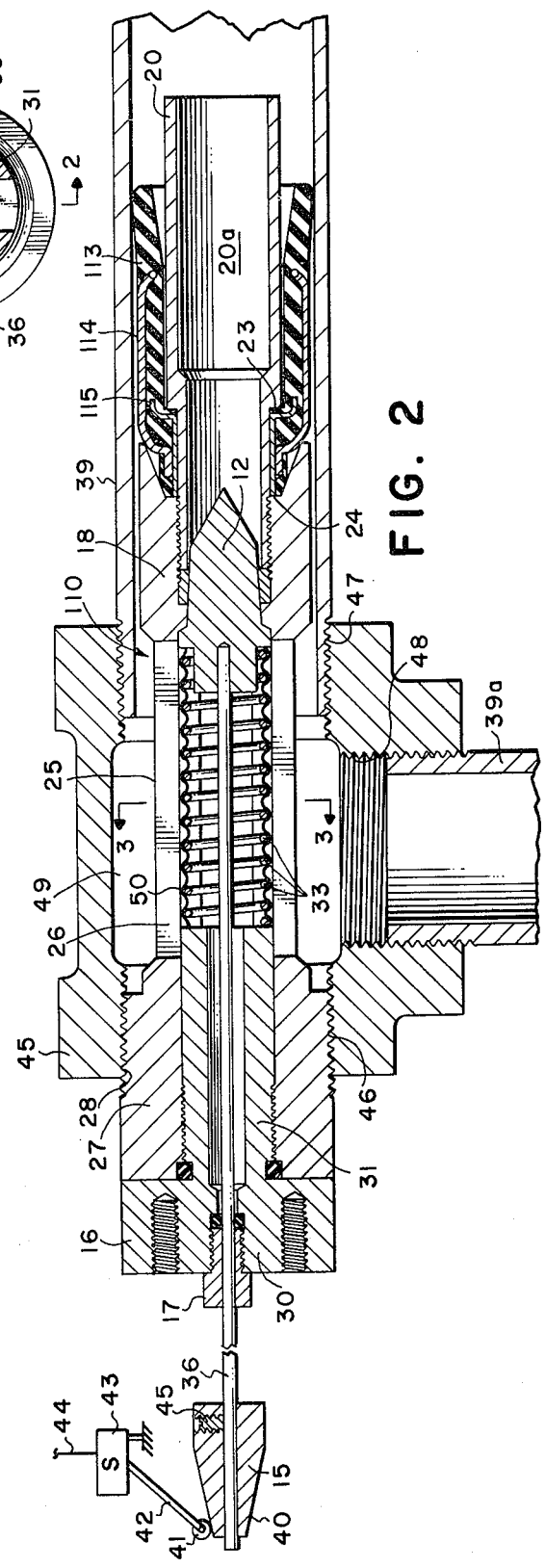
FIG. 2 is a cross-sectional view of a second embodiment of this invention in place in the flowline of a well.

A frusto-conical cam member 15 is secured to rod 36 near its outermost exposed end. Cam member 15 has a conical surface 40 arranged to engage a cam follower wheel 41 attached to a rigid switch arm 42 which in turn actuates a signaling switch 43 for sending a pulsed signal through conduit 44 to the well control box as illustrated in FIG. 2. Conduit 44 corresponds to conduit 20 of FIGS. 1-6 of the aforementioned incorporated application, Ser. No. 469,264, said conduit being the signal input lead to the well control panel. Member 15 is secured to rod 36 by means of a seat screw 45 threadedly engaged in member 15 and screwed into tight abutment with rod 36.

Referring now to FIG. 2, a second embodiment of the invention is disclosed wherein a flow sensing cartridge 110 is shown engaged in a standard flowline configuration of a typical oil well. Flow sensing cartridge 110 is similar in construction to cartridge 10, but differs in that the sealing cup 113 contains dual reinforcing structures 114 and 115. Structure 115 is a cup type structure located near the internal diameter of cup 113. Structure 114 is a reinforcing wire located near the external diameter of cup 113. The elastomeric substance comprising cup 113 preferably is bonded to the structures 114 and 115 which structures provide rigidity and wear ability for the sealing cup and prevent distortion and creep of the cup under high flow pressures. Reinforcing structure 114 is preferably joined to cup 115 by means such as welding, and elastomeric material is bonded to the external surface of cap 115 to provide a structure between the annular shoulders 23 and 24. The remaining sections of flow cartridge 110 are identical in structure to those of cartridge 10 and are numbered accordingly.

In FIG. 2, a normal flowline system from a typical oil well is disclosed to illustrate placement of the flow cartridge 10 or the flow cartridge 110 into the flowline from the pumped oil well. Normally a tubular flowline 39 from the well will be located above and parallel to the ground surface. The flowline usually travels a short distance and then moves back underground until it reaches the storage area. At the end of the flowline, above the ground, is usually threaded a standard tee 45 having a left hand threaded bore 46, a right hand threaded bore 47, and a lower threaded bore 48. The flowline conduit 39 from the well may be threaded into the right hand bore 47 and the downward continuation 39a of the flowline out of the tee 45 is engaged in the lower bore 48. Normally a blank plug or bull plug seals off the left hand bore 46. To place the flow sensing cartridge into the flow string, all that is required is a removal of the blank or plug from bore 46 and insertion of the flow cartridge seal member through bore 46 and bore 47 into tubular conduit 39. The seal member at a point near the front edge of the flow sensor engages the walls of conduit 39 thereby channeling all flow from the oil well through the bore passage 20a in the retainer sleeve 20.

Thickened portion 27 sealingly engages bore 46 and is threaded into bore 46 on threads 28 thereby blanking off bore 46. Rod 36 extends out of the flow sensing cartridge and into the area of switch 43 which switch 43 is secured to receptacle 16, to a separate structure anchored in the ground, or attached to any stationary structure at the well site. As previously described, a cam follower wheel 41 rests upon conical surface 40 of cam member 15. Wheel 41 is rotatably mounted on a switch arm 42 which actuates a signal switch 43 to send electrical signals through conduit 44 to the well control panel.

Figure 3:
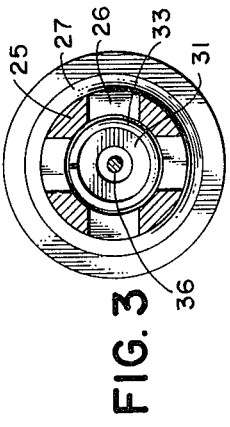
FIG. 3 is an axial cross-sectional view of the embodiment of FIG. 2 taken at line 3—3 thereon.

Referring now to FIG. 3, which is a cross-sectional view of the central portion 25 taken at line 3—3 of FIG. 2, the slotted structure of central portion 25 can more clearly be seen. In FIG. 3 can be seen the central section 25 and slots 26 surrounding coil spring 33 and rod 36.

In typical operation, after the bull plug has been removed and the flow sensor cartridge has been inserted through the tee and into the well flowline 39, the pump is started once again and pumped fluid pulses through conduit 39 whereupon it is channeled through bore passage 20a of sleeve 20 forcing orifice member 12 back against compression spring 33 thereby opening the flow orifice seat 34 to fluid flow. The fluid flows around member 12 through slots 25 and into the tee chamber area 49 surrounding the reduced OD section 25. From the chamber area 49, the fluid flows downward through bore 48 and out of the tee into conduit 39a. Flow usually occurs from the pumped well during the up-stroke of the pump sucker rod on a mechanically pumped well and, on the down-stroke of the sucker rod, no flow occurs as the pump is being refilled. The surge of pumped fluid that occurs on the up-stroke of the sucker rod pump moves through the conduit 39 forcing orifice member 12 back against the spring, which simultaneously moves rod 36 and cam 15 outward. The movement of cam member 15 wedges cam follower wheel 41 upward on cam slope 40 thereby actuating switch arm 42 which in turn initiates an electronic signal in signal switch 43. The signal moves along conduit 44 to the control panel, indicating a pumping condition occurring in the well as opposed to a non-pumping condition arising from pump malfunction or a pumped-off condition in the pump.

When the flow sensing cartridge disclosed herein is utilized in a well that is characterized by large quantities of sand in the produced fluid or by large amounts of paraffin, it may be preferable to enclose coil spring 33 within a flexible membrane such as shown in FIG. 2 and designated at 50. This prevents sediment, sand, or paraffin from becoming wedged in coil spring 33 and thereby helps eliminate malfunctioning of the flow sensing cartridge.

This invention is particularly advantageous for use as a flow sensor in a pumped well because of its simplicity and dependability. It utilizes mechanically actuated components to detect flow pulses and converts these mechanical pulses into electrical signals by simple reliable means. The use of the flow orifice helps prevent jamming and packing of complicated components in the prior art devices by sand and sediment. Since the flow keeps the orifice area washed clean of such deposits, than the relatively uncomplicated construction of the cartridge prevents malfunctions in the spring and signaling area. By using the mechanical dependability of this invention, the well operator can dispense with such complex methods as strain gauge, amperage meters, and magnetic proximity switches as utilized in other devices.

Figures 4, 4A, 5:
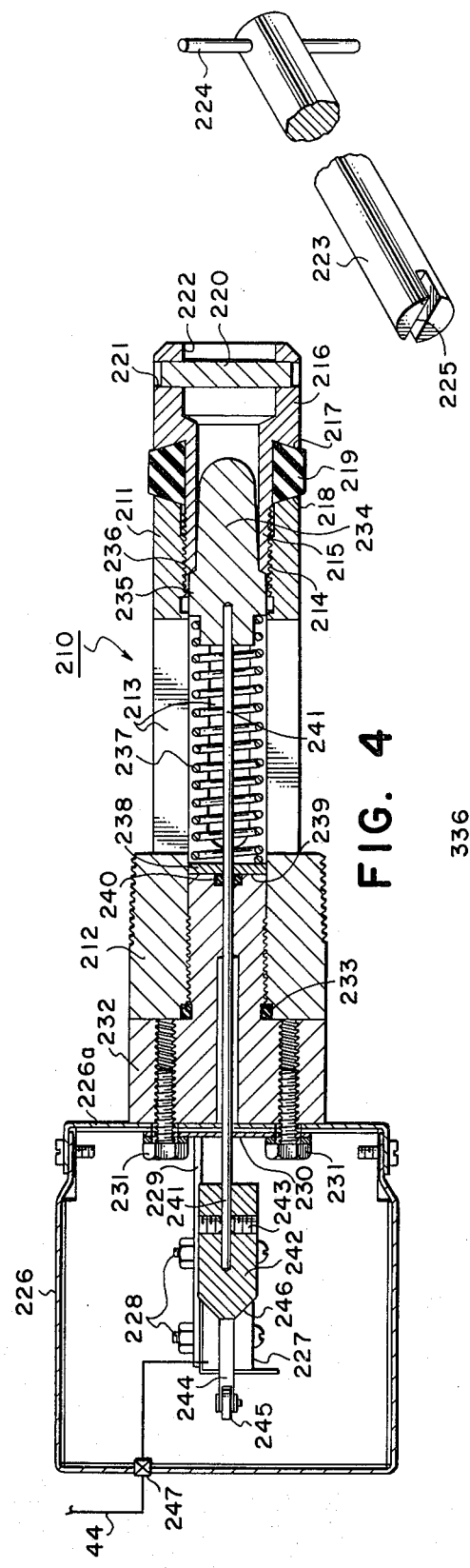
FIGS. 4 and 5 are cross-sectional top views of alternate embodiments of the invention.
FIG. 4A illustrates a tightening rod for use with the invention.

Referring now to FIGS. 4 and 5, other embodiments of the invention are disclosed having means for adjusting and packingoff the sealing cup at the forward end of the flow sensing cartridge. FIG. 4 illustrates a top cross-sectional view of the third embodiment of the invention in which means is disclosed for expanding the sealing element into tight engagement with the inner wall of the flowline 39.

In this embodiment, a flow sensing cartridge 210 is disclosed for placement in a pumped well flowline. The sensor cartridge 210 utilizes a tubular body 211 having an enlarged end 212 with external and internal threads. Immediately adjacent end 212 are four elongated flow slots 213 passing through the wall of the body member 211. At the opposite end of the body is an internally threaded section 214 into which is threadedly engaged a seal compression sleeve 215. This seal sleeve has an enlarged outer end 216 with an angular annular face 217 facing the tubular body 211. Likewise, the end of body 211 is formed in an angular annular face 218 facing the annular face 217. The conjunction of sleeve 215, face 217, and face 218 serves to form a dovetail groove being wider at the base than at its outer periphery. Prior to the insertion of seal sleeve 215 into body 211, an elastomeric expandable seal ring 219 having a wider base than outer periphery is placed over the sleeve in abutment with face 217.

Thereafter, threaded engagement of sleeve 215 into threaded section 214 of body 211 moves faces 217 and 218 toward each other until both faces are contacting seal ring 219. Further tightening of sleeve 215 axially compresses seal ring 219 expanding it radially outward.

A transverse tightening pin 220 is located in a transverse pin bore 221 drilled through the walls of sleeve 215 near its outer end. The outer end of body 211 has a bore opening 222 through which pin 220 passes transversely. In FIG. 4a, a tightening rod 223 is shown having a tee handle 224 at one end and a pin engaging slot 225 at the opposite end. The slotted end of rod 223 is sized to be of a lesser diameter than bore opening 222 in body 211 and the slot 225 is wider than pin 220, thus allowing rod 223 to be inserted in bore 222, enveloping pin 220 so that tightening or loosening torque may be applied to sleeve 215 by means of rod 223 acting on pin 220.

Installment of flow sensing cartridge 210 in the flowline is similar to that of cartridges 10 and 110 except that an additional step is added. After the blind or bull plug is removed from the outer bore of the tee and the flow cartridge 210 is inserted through the tee and into the inlet flowline 39 and threaded into the tee, a break is made in flowline 39 upstream of the flow sensing cartridge 210 at an upstream union or tee and the tightening rod 223 is inserted down the flowline until slot 225 slips over pin 220. The tee handle 224 is then rotated until sleeve 216 has threaded inwardly enough to expand ring seal 219 into tight engagement with the inner wall of flowline 39. The upstream union or tee is then reconnected and the cartridge is ready for use.

Alternatively, installment of flow cartridge 210 may be achieved without need for breaking the flowline upstream of the cartridge by using a rod 223 having a diameter smaller than the narrowest internal diameter of the compression sleeve 215. The cartridge 210 is assembled into two subassemblies, with the housing subassembly comprising tubular body 211, seal ring 219, compression sleeve 215, and tightening pin 220. After removal of the blind plug in the tee, the housing subassembly is inserted through the tee and into the flowline. End 212 of the body is threaded into the tee threaded opening. Rod 223 is then inserted through the tubular body from end 212 until the slotted end 255 engages pin 220. The tee handle 224 is rotated counterclockwise until the compression sleeve has compressed seal ring 219 sufficiently to seal against the flowline. Then rod 223 is removed from the housing subassembly and the remainder of the flow cartridge components, including member 234, spring 237, rod 241, head 232, and the switch components with enclosure 226, are reassembled with the housing subassembly and the flow cartridge is ready for use.

In FIG. 4, one embodiment of an actual switch construction is shown in partial cross-section. In this embodiment, a protective enclosure 226 surrounds an electro-mechanical micro-switch 227 which is slidably mounted by means of bolts 228 to a horizontal bracket 229. Bracket 229 is secured to vertical plate 230 which, along with enclosure end plate 226a, is held by bolts 231 passing therethrough into threaded engagement in seal receptacle head 232 in body section 212. An o-ring seal 223 between head 232 and body section 212 provides fluid-tight sealing therebetween.

An orifice member 234 is slidably located inside body 211 and has a sealing shoulder 235 having a forward sloping annular seal face 236 which is arranged for sealing abutment against the inward end of sleeve 215. A coil spring 237 fits over the opposite end of member 234 and abuts the other side of shoulder 235. Spring 237 is in constant compression and applies a permanent biasing force on member 234 towards sealing abutment with sleeve 215. The rearward end of spring 237 abuts a seal retainer plate 238 which in turn abuts the forward end 239 of head 232 inside body portion 212. An annular cavity in forward end 239 receives an o-ring seal 240.

An extended signal rod 241 is secured inside member 234 and extends rearward through spring 237, seal 240, head 232, and into enclosure 226. Seal 240 provides a fluid-tight seal between rod 241 and head 232.

An activating cam 242 is secured to rod 241 inside enclosure 226 by means such as threads, welding, or by threaded set screws 243 in cam 242 abutting rod 241.

Micro-switch 227 has an activating arm 244 operably connected thereto, which arm has a rotatable cam follower 245 mounted thereon arranged to contact cam 242 along its reaward conical cam surface 246.

Operation of the flow sensor is substantially identical to that of the embodiments of FIGS. 1–3, with an electrical signal being generated by the micro-switch each time the cam 242 moves backward actuating the cam follower 245. The generated signal moves via conduit 44 to the well control panel. A sealed opening 247 in the wall of enclosure 226 provides an opening for conduit 44 to pass out of the enclosure.

Adjustment in the amount of rearward movement required to actuate micro-switch 227 may be obtained by loosening bolts 228 and sliding switch 227 along bracket 229 which has elongated slots therein for receiving bolts 228. Adjustment may also be accomplished by loosening set screws 243 and sliding the cam backward on rod 241. In FIG. 4, the switch has been moved to the extreme rearward position to more clearly illustrate its components in the drawing, but in operation, switch 227 will be located further forward at the point where cam follower 245 is on surface 246.

FIG. 5 illustrates a top cross-sectional view of a different mode of switch structure and method of mounting in which a gas-tight explosion proof signaling switch is utilized in situations where there may be a danger of explosion and fire on an oil well having flammable gases leaking in the area.

The electro-mechanical signaling switch is located in an explosion proof sealed box 326. Box 326 is mounted on end plate 330 by means of one or more threaded screws 328. Adjustment of the switch location with respect to cam 342 is accomplished by the use of one or more spacer plates 329 of varying thickness between box 326 and the end plate. Plate 330 is attached to head 232 by bolts 231 which also secures the switch enclosure 336 to the flow cartridge 210.

Switch box 326 has a shaft housing 331 extending from the side thereof below the extended cam rod 341 which passes through cam 342. A switch activation shaft 332, shown in phantom, extends through the housing 326 to the micro-switch 327. Appropriate seals are provided around screws 328 and shaft 332 to prevent gas leakage thereby. A cam follower 345 is rotatably held in a forked switch arm 344 which in turn is attached to shaft 332 and held thereon by a threaded nut 333 on the threaded outer end 334 of shaft 332.

A guide support bracket 335 is attached by screws 338 to box 326 and has an angular section 337 extending out at approximately 90 degrees to box 326. A hole 339 in section 337 has a hollow bushing screw 340 passing therethrough and held in place by a retainer nut 347 threaded thereon. A passageway 348 through screw 340 receives in slidable relationship extended rod 341. The coaction of bushing screw 340 and guide bracket 335 provides support for the outer end of rod 341 and prevents any substantial flexing of the rod and cam 342 away from the cam follower 345 during movement of the cam under the cam follower.

Installation of flow sensor 310 is substantially identical to that of sensor 210 as is the operation of the two embodiments. A sufficient rearward movement of the cam 342 will actuate micro-switch 327 which generates an electrical signal along conduit 44 to the well control panel. Conduit 44 passes from switch 327 through fluid-tight sealed openings 349 and 350 in the walls of box 326 and enclosure 336.

Figure 6:
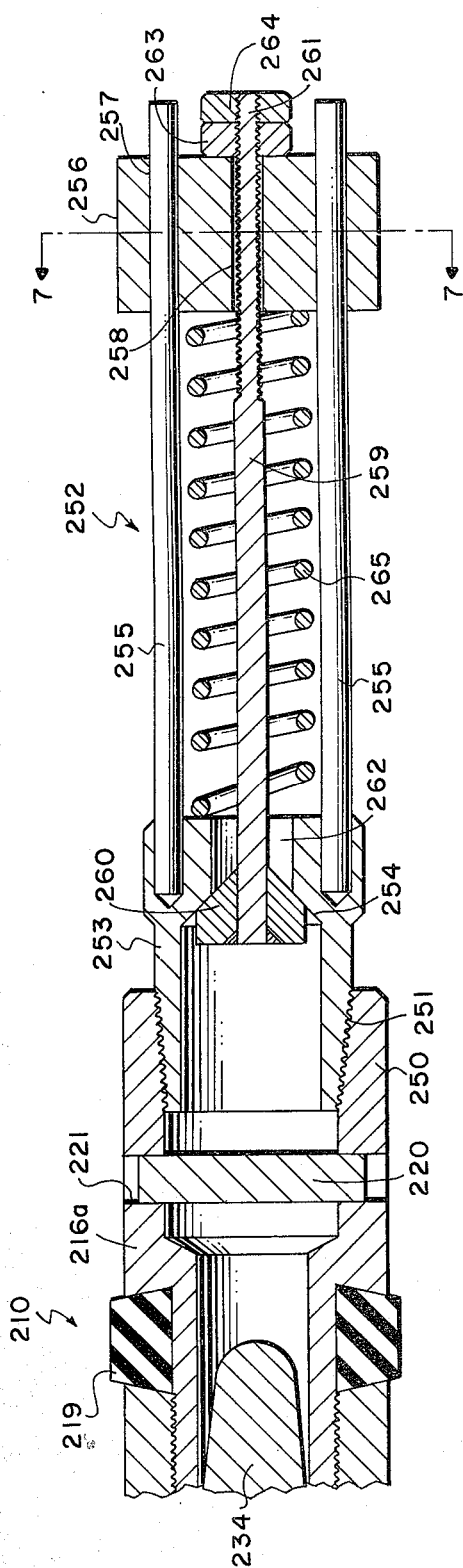
FIG. 6 illustrates a cross-sectional view of an additional embodiment a back pressure mechanism.
Figure 7:
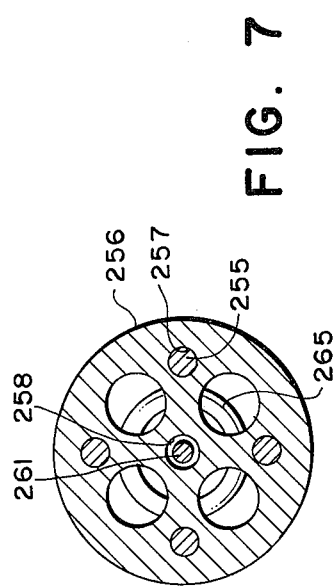
FIG. 7 is a an axial cross-sectional view of the embodiment of FIG. 6 taken at line 7—7 thereon.

FIG. 6 shows a modification of the invention, which modification is particularly advantageous in wells producing high volumes of gas.

In this embodiment of the invention, the flow sensing cartridge 210 of FIG. 4 is shown having an elongated skirt section 250 with internal threads 251 formed therein. A back-pressure valve assembly 252 is threadedly connected to the flow cartridge at 251 in coaxial alignment therewith.

Valve assembly 252 comprises an externally threaded valve seat housing 253 threaded into shirt 250 and containing a tapered valve seat 254 concentrically therein. A plurality of elongated guide rods 255 are imbedded in the end of housing 253 and extend generally parallel to the longitudinal axis of cartridge 210 and valve assembly 252.

A sliding block 256 has longitudinal holes 257 therethrough for receiving guide rods 255 in slidable relationship. A central bore passage 258 extends through block 256 receiving a valve stem 259 passing therethrough. Further openings through the block allow fluid to flow therethrough.

Valve stem 259 has an enlarged tapered valve member 260 formed at one end thereon and a threaded end 261 at the opposite end. The valve stem extends through a central passage 262 in housing 253 such that the tapered valve member 260 is arranged for sealing contact with tapered valve seat 254. A threaded adjusting nut 263 and a threaded locknut 264 are both threaded onto end 261 of stem 259 and abut sliding block 256.

A coil spring 265, having substantially greater stiffness than spring 237 of flow cartridge 210, is located in compression between block 256 and housing 253 and thus provides a strong resilient biasing force tending to maintain valve 260 seated in valve seat 254. The amount of biasing force provided by spring 265 may be adjusted by threading nut 263 up or down on valve stem threaded section 261. Locknut 264 is tightly threaded against nut 263 after adjustment has been completed in order to prevent loosening of the nut and changing of the spring force during the cyclic operation of the valve assembly. This also prevents complete disassembly of the valve assembly during operation.

As previously mentioned, this embodiment is especially advantageous for use with pumped wells producing large amount of gas with the oil. The problem that arises in trying to sense pumped flow from such wells with a pulse-type sensor is that the large amounts of gas present in the production string and pump provide a cushion or pulse-dampener which tends to smooth out the pumped fluid pulsations much the same way as a large accumulator tank on a common piston-type air compressor serves to smooth out the pressure pulsations of the compressor to provide a smooth even supply of compressed air.

This pulse-dampening effect tends to cause the normal flow pulse sensor to move to a moderate open position and remain there constantly, allowing flow therepast but not reacting to the flow in any measurable manner.

By the use of this embodiment, the large volumes of gas may be placed in high compression by the use of the back-pressure assembly 252 which utilizes a relatively stiff valve spring 265. The compression of the gas is on the order of 100 to 150 PSI and as a result, the entrained gas from the pumped well fluid is compressed and held to a small volume which causes the gas to act more like incompressible liquids than like a compressible gas.

When the pump is started up to begin production, the gas in the pump, the production string, and the production flowline will be compressed to the opening pressure for valve assembly 252. Each successive pump stroke thereafter will move the valve 260 off seat 254 and pass a charge of well fluid and/or highly compressed gas, and then the stiff valve spring 265 will close the valve during the pump downstroke.

Since the valve member 260 may have to move only a fraction of an inch to transmit the gas and/or well liquid, this relatively small movement would be unsuitable for activating a flow sensor mechanism such as is connected to cartridge 210.

The slug of liquid and high-pressure gas which was passed from valve assembly 252 to the flow cartridge 210 serves to produce an amplified surge of the valve member 234 due to the greatly reduced spring force of valve spring 237 compared to that of spring 265.

This magnified surge of valve 234 is highly desirable in obtaining positive flow readings from the sensing assembly comprising cartridge 210 and switch 227. Thus, it can be seen that the back pressure assembly serves to act as an amplifier in the flow sensing system by changing the nature of the pumped fluid from compressible to almost incompressible.

Installation of the flow sensing system is easily performed without requiring extensive breakdown of the well flowline. The back pressure valve assembly 252 is threadedly attached to end 216a of sleeve 215 after desired adjustment of nuts 263 and 264 has been performed. Valve member 234, spring 237, head 232, rod 233, and the switch components are removed and the flow cartridge and back-pressure valve assembly are then placed in the flowline through the flow tee after removal of the blind plug; (as previously described). The packing seal 219 is expanded into sealing contact with the flowline inner wall by use of the tee-handle on tightening pin 220. The remaining components are then reinserted into the flow cartridge and tightened to provide a fluid-tight seal and the sensing system is ready for operation.

Thus it can be seen from the description above, that a substantially fail-proof electro-mechanical sensing system is disclosed which detects pumped fluid pulses, using a mechanical actuator driven by the pumped fluid, to trip an electro-mechanical switch thereby generating an electric signal for the well control system.

Although certain prefers embodiments of the present invention have been herein described in order to provide an understanding of the general principles of the invention, it will be appreciated that various changes and innovations can be effected in the described flow sensor without departure from these principles. For example, other types and configurations of sealing means for contacting the flow conduit can be used, such as o-rings and inflatable packing elements. All modifications and changes of this type are therefore deemed to be embraced by the spirit and scope of the invention except as the same may be necessarily limited by the appended claims or reasonable equivalents thereof.

The embodiments of the invention in which an exclusive property or privilege is claimed are defined as follows:

1. Flow sensing apparatus for generating a signal in response to a flow condition through a flow conduit comprising;
    elongated tubular body means sized for close-fitting insertion into a flow conduit and adapted to force a substantial portion of the fluid flow in the conduit therethrough, and having elastomeric seal means thereon arranged to seal against the inner surface of a flow conduit;
    a flow responsive member slidably located in said tubular body means and adapted to close the inner passage of said body means in one position of said member;
    biasing means in said body means abutting said member and continuously urging said member against the fluid flow through said body means towards said closing position in said body means;
    extension means attached to said member and extending slidably out of said body means; and,
    switch means operably engaging said extension means and arranged to convert movements of said extension means into pulse signals.

2. The flow sensing apparatus of claim 1 wherein said switch means comprises an electro-mechanical switch adapted to receive and convert mechanical pulses into an electrical pulse signal.

3. The flow sensing apparatus of claim 1 wherein said extension means is an elongated rod arranged to extend out of said tubular body means and the flow conduit, with cam means thereon; and said switch means includes and is actuated by a mechanical cam follower engaging said cam means.

4. The flow sensing apparatus of claim 1 wherein said flow member in a second position in said tubular body means forms a flow orifice therein, and said tubular body means has flow exit means through the wall thereof downstream of said flow orifice.

5. The flow sensing apparatus of claim 1 wherein said tubular body means further comprises connection means for securing said body means to a flow conduit system, said connection means being located at least partially exteriorly to the flow conduit system; with said extension means arranged to extended sealingly and slidably through said connection means.

6. The flow sensing apparatus of claim 5 wherein said switch means is securedly attached to said exterior portion of said connection means.

7. The flow sensing apparatus of claim 1 further comprising means for expanding said seal means into relatively tight sealing engagement with the inner wall of a flow conduit.

8. The flow sensing apparatus of claim 7 wherein said seal means comprises an elastomeric ring encircling said body means, and said expanding means comprises a shouldered sleeve threadedly engaging said body means and arranged to apply axial compression to said seal ring to radially expand said seal ring.

9. A flow sensing cartridge adapted to be inserted through a flowline having a flow tee therein, said flow cartridge comprising:
    a tubular body adapted to be inserted through a flow tee and into a flow conduit;
    connection means on said body for connection to a flow tee through which said body has been inserted;
    an annular orifice seat in said body;
    an orifice closing member located slidably in said body and arranged for substantially sealing engagement in said orifice seat in a first position of said slidable member;
    seal means on said body for sealing engagement with the inner surface of a flow conduit;
    biasing means continuously urging said orifice member against said orifice seat;
    orifice flow area means downstream of said orifice seat arranged to allow fluid flow past said orifice seat from the flow conduit in a second position of said orifice member;
    signal rod means attached to said orifice member and extending sealingly and slidably out of said tubular body past the flow tee; and,
    switch means engaging said signal rod means and adapted to be actuated into sending signal pulses by movement of said signal rod means.

10. The flow sensing cartridge of claim 9 further comprising seal expanding means for radially expanding said seal means into tight sealing engagement with the inner wall of a flow conduit.

11. The flow sensing cartridge of claim 9 wherein said switch means comprises an electro-mechanical switch adapted to be actuated into sending electrical impulses by mechanical movement of said signal rod means.

12. An amplified flow sensor for generating pulsed signals in response to pumped fluid flow through aa flow conduit, comprising:
    back pressure valve means locatable in a flow conduit and operable by high pressure;
    low pressure response means connected to and fluidically communicating with said back pressure valve means and responsive to pressure pulses therethrough;
    signal means operable connected to said pressure response means and mechanically actuated thereby; said signal means adapted to send a signal in response to said pressure pulses through said low pressure response means.

13. The flow sensor of claim 12 wherein said back pressure valve means comprises a valve member, a valve seat adapted to receive said valve member in closing engagement therein, and first resilient biasing means urging said valve member into said valve seat.

14. The flow sensor of claim 13 wherein said low pressure response means comprise a tubular body having an orificed flow passage therethrough, a pressure responsive member in said body and arranged to be moved into closing engagement in said flow passage, and second resilient biasing means urging said pressure responsive member against flow through said flow passage; said first biasing means being substantially stronger than said second biasing means.

15. A flow sensing system for detecting fluid flow from a rod-pumped oil well through the oil well production flowline, said sensing system comprising:
   high pressure opening means adapted to be located in a well flowline and arranged to open said flowline to fluid flow only in response to relatively high pressure therein;
   high amplitude response means in communication with and downstream of said opening means and adapted to generate a large responsive movement upon opening of said opening means; and,
   signal means operably connected to said response means and adapted to generate a signal in response to said generated movement.

16. The flow sensing system of claim 15 wherein said high amplitude response means comprises a flow sensing cartridge adapted for slidable engagement in a flowline; said cartridge having a spring biased flow valve therein and resilient sealing means thereon for sealing engagement in a flowline.

17. The flow sensing system of claim 16 wherein said high pressure opening means comprises a resiliently biased valve located upstream of said response means and having closing biasing means substantially stronger than said spring biased flow valve.

18. The flow sensing system of claim 17 wherein said high pressure opening means further comprises a valve seat encircling a flow passage, a valve member arranged for closing said flow passage by abutting said valve seat, a biasing spring arranged to bias said valve member into said seat against pump fluid flowing therethrough, and means for adjusting the biasing force of said spring.

* * * * *